UNITED STATES PATENT OFFICE.

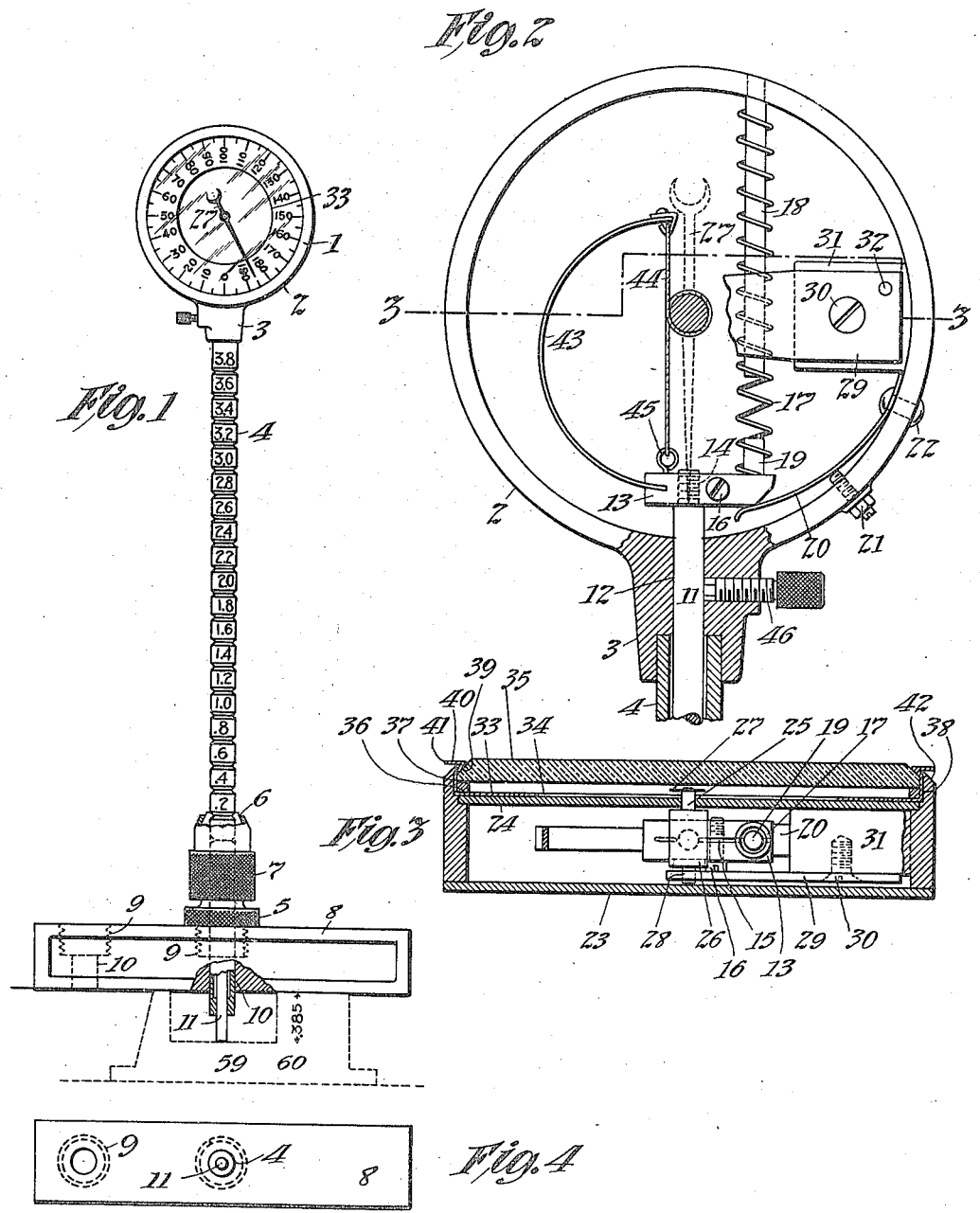

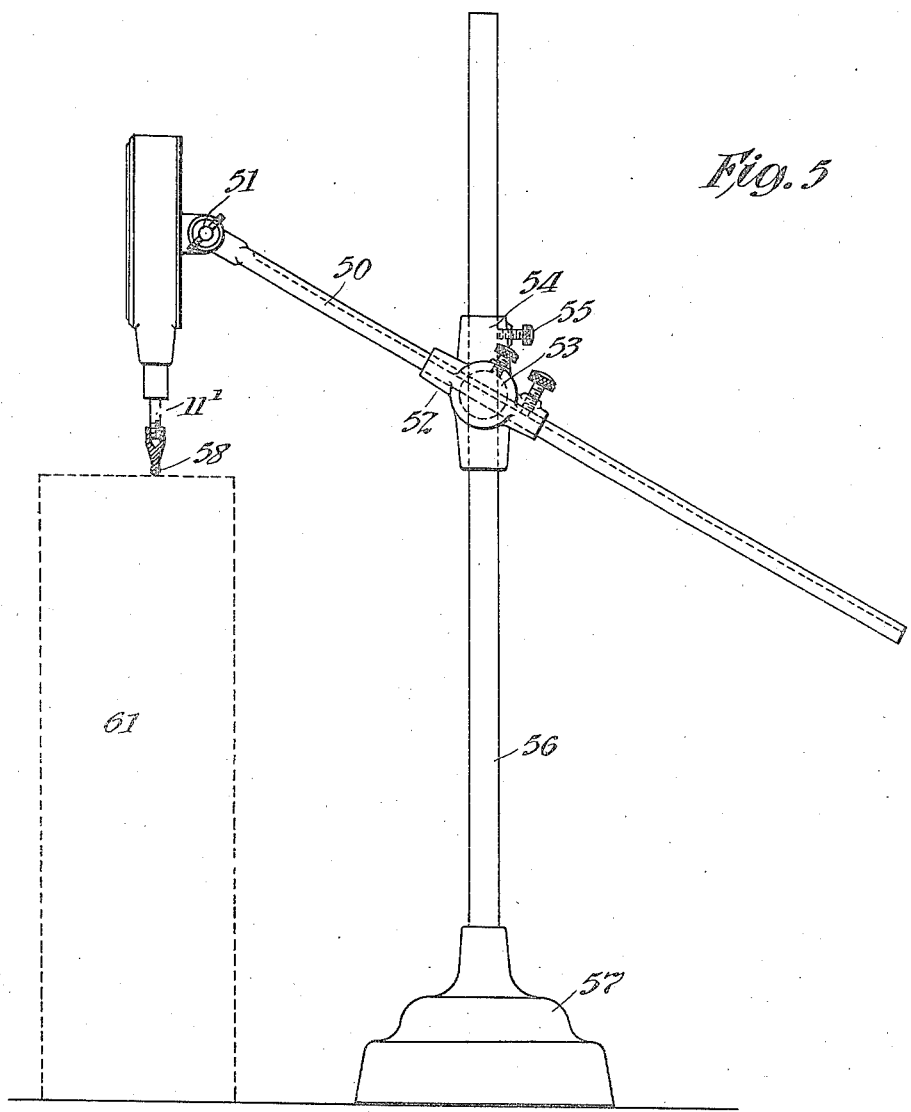

WILLIAM C. MacKINNON, OF WEST ORANGE, NEW JERSEY.

MEASURING INSTRUMENT.

1,160,630.　　　　　Specification of Letters Patent.　　Patented Nov. 16, 1915.

Application filed July 23, 1907. Serial No. 385,162.

*To all whom it may concern:*

Be it known that I, WILLIAM C. MACKINNON, a citizen of the United States, and a resident of West Orange, in the county of Essex and State of New Jersey, have invented certain new and useful Improvements in Measuring Instruments, of which the following is a description.

My invention relates to measuring instruments, and more particularly to surface or depth gages, and consists in parts, improvements and combinations herein set forth and claimed.

In order that my invention may be clearly understood, reference is hereby made to the accompanying drawings wherein the same reference numerals are used to indicate the same parts throughout, and in which—

Figure 1 is a front elevation of one form of my invention, the improved gage being shown in this figure as arranged for use as a depth gage. Some parts are broken away in this view to show the details of construction; Fig. 2 is a rear elevation on a larger scale of the dial casing with its back removed, certain of the parts being broken away and others shown in section for greater clearness; Fig. 3 is a cross-sectional view, taken on line 3—3 of Fig. 2; Fig. 4 is a bottom plan view of the device shown in Fig. 1, and Fig. 5 is an elevational view of my improved measuring instrument mounted for use as a surface gage.

The casing 1 comprises a cylindrical ring 2 formed with an outward projection 3 in which is secured the sleeve 4 which, as shown in Fig. 1, is graduated for the rough or preliminary measurement. In the device illustrated, the sub-divisions of this sleeve are formed at each .2 of an inch, and it is provided with peripherical grooves at each such point of sub-division. A chuck 5 is provided with spring jaws 6, which can be clamped in place within the aforesaid subdividing grooves by means of a clamping sleeve 7. This chuck 5 is screwed into a suitable straight edge 8 within screw threaded apertures 9, 9 therein, one such aperture being shown at the middle of the said straight edge, and one near the end thereof, in order that the device may be used in measuring the depth of holes formed close to a wall. Extensions 10, 10 of the orifices 9 are provided, through which the sleeve 4 may extend. Within the longitudinal cavity of the sleeve 4 is a measuring rod 11, which normally projects beyond the end of the sleeve for a distance which is preferably equal to one of the subdivisions of the sleeve
or, in the device illustrated, .2 of an inch.
The opposite end of the measuring rod 11 extends through an orifice 12 within the casing ring 2, and is provided within the said casing with a cross head 13, which is provided with a screw threaded orifice 14 to receive the threaded end of the said measuring rod 11. This cross head is preferably split longitudinally as is shown at 15, and is provided with a screw 16 for clamping it upon the rod 11. By this means the rod may be adjusted within the cross head and secured at any desired point of adjustment. A spring 17 interposed between the inner wall of the ring 2 and the cross head 13 and held in place, for example, by studs 18 and 19, serves to project the rod 11 from the casing 1 and the sleeve 4. A stop 20, which is formed of material of a somewhat resilient nature, serves to limit the distance which the measuring rod 11 extends beyond the casing 1. This stop may be adjusted by means of the screw 21, and is secured to the inner wall of the ring 2 by suitable fastening means 22. The casing 1 is provided with a back plate 23 and a front plate 24. In the plate 24 is formed the front bearing for the trunnion 25 of the shaft 26, which carries the pointer 27. The rear trunnion on this shaft, indicated by the reference numeral 28, has a bearing in a bar 29 suitably secured within the casing, as for example by means of a screw 30, by which it is held in place in a block 31, secured either to the front plate 24 of the casing or to the ring 2, or to both, as may be deemed desirable. A dowel 32 may be used if desired, to accurately position the said bearing arm 29. The dial 33, which is preferably provided with central opening 34, is placed upon the plate 24, and is provided with suitable graduations, as shown in Fig. 1. This dial and pointer 27 are covered by a glass 35, which is held at a suitable distance from the dial by means of a ring 36.

The dial, which is preferably formed of a resilient material, is formed with a flange 37 which fits within a recess 38 within the ring 2, and this flange is preferably spun or turned up upon the glass 35, as shown at 39, and is again flanged outwardly as shown at 40, the margin of the last named flange being preferably provided with a knurled edge 41, by which the dial may be turned bodily within the casing. The ring 2, at the outer beveled edge of the recess 38, is spun inward slightly at 42 so as to retain the dial in place therein, but not with sufficient tightness to prevent the bodily rotation of the dial by means of the knurled flange 41. The preferable means which has been illustrated for rotating the pointer 27 by the longitudinal movement of the measuring rod 11, comprises a bow spring 43, which is secured in place within the cross-head 13, a flexible cord 44, preferably made of silk or the like material, interposed between the outer end of the bow spring 43 and the cross head 13 and secured to the latter by any approved fastening means, as, for example, by a screw eye 45. A knurled screw 46 is threaded into one side of the enlargement 3 of the ring 2, and when screwed down its inner end bears upon the measuring rod 11. By means of this screw, the rod may be secured in any given position, as, for example, when a measurement is made in the dark, and the instrument may then be removed bodily and the depth of the hole measured, or other reading may be taken, where more light can be obtained.

In the device shown in Fig. 5, the straight edge and the graduated sleeve are dispensed with and the instrument is supported preferably from the back of the casing. I have shown it supported upon a rod 50 with relation to which it may be angularly adjusted by means of screw 51. The rod 50 in turn is supported in a sleeve 52 rotatable upon a stud 53, which is in turn supported upon a sleeve 54, which last named sleeve may be vertically adjusted and held by means of a screw 55 upon a standard 56 which is supported upon a base 57. In this instance I have shown the measuring rod 11' provided with a suitable bearing surface, such as the rounded knob 58. It is evident that other points could be provided for the rod 11' as desired.

When a device constructed in accordance with my invention is to be used as a depth gage, as shown, for example, in Fig. 1, the straight edge 8 is placed upon the object 59, when it is desired to measure the depth of the opening 60 therein. The clamping sleeve 7 is then loosened and the jaws of the chuck 5 are placed in that groove of the sleeve 4 corresponding most nearly to the depth of the opening 60. The measuring rod 11 now rests upon the bottom of the said opening and is projected thereby against the force of the spring 17 within the casing 1 and by the operation of the cord 44, which is wound around the shaft 26 and held taut by the spring 43, the pointer 27 is turned upon the dial to indicate how much greater the depth of the opening 60 is, than is indicated by the rough reading upon the sleeve 4.

In the device I have illustrated in Fig. 1, and wherein the normal projection of the rod 11 is .2 of an inch, I have shown the dial 33 divided into 200 equal parts, each of which, therefore, corresponds to .001 of an inch. The movement of the pointer 27 begins at the sub-division 200 and continues backward throughout the scale until it has passed through an entire revolution. By this arrangement the amount which the measuring rod 11 extends from the end of the sleeve 4 may be read off directly from the scale, since at the beginning of its inward movement the measuring rod extends .2 of an inch beyond the end of the said sleeve and at the close of the said movement, when it has reached the zero point on the scale, it is flush with the end of the said sleeve. If the distance to be measured does not exceed .2 of an inch, the sleeve 4 is fastened within the straight edge 8 by means of the chuck 5, so that the lower end of the said sleeve will be flush with the lower surface of the straight edge, the jaws 6 of the chuck engaging with the groove which is shown in dotted lines in Fig. 1.

The device shown in Fig. 5, is used to determine the flatness or uniformity of one surface with respect to another. Both the article to be tested, as the block shown at 61, and the gage supported upon the stand 57, being placed on a surface which is as nearly plane as can be secured, the gage and the object being then moved relatively to one another upon the said surface. When the device is used in this way it is desirable that the dial may be rotated in order that the pointer may be made to point initially to some particular sub-division on the dial, as, for example, the sub-division 100, and any deviation of any portion of the surface from this point may be then conveniently and accurately determined.

Having described my invention, I claim—

1. In a measuring instrument, the combination of a dial casing, a measuring rod projecting therefrom, a spring to hold the rod projected and a resilient stop for limiting the distance which the rod projects from the casing, a dial and pointer in said casing and connections between said rod and said pointer such that as the rod is caused to project more or less, the amount of such projection beyond a fixed point may be indicated directly by said pointer on said dial, substantially as set forth.

2. In a measuring instrument, the combination of a dial casing, a measuring rod extending therefrom through one of its sides, a spring for holding the rod projected, an adjustable stop for limiting the amount of its projection, a dial and pointer in said casing and means whereby the pointer may be made to indicate directly the amount of projection of the said rod beyond a fixed point, substantially as set forth.

3. In a measuring instrument, a casing, a measuring rod projecting therefrom, a crosshead thereon within said casing, a spring acting on said cross-head to hold said rod projected, a shaft having a pointer thereon, a bow spring supported by the cross-head, and a flexible cord interposed between the said rod and the end of said bow spring and encircling the said shaft, substantially as set forth.

4. In apparatus of the class described, a dial casing having an annular seat therein and provided with a cover, a dial frictionally retained in said seat and below said cover and having an outwardly extended edge accessible from the exterior of the casing and cover, whereby said dial may be adjusted in its seat, and a movable pointer for said dial, substantially as described.

5. In a measuring instrument, the combination of a casing, a graduated sleeve secured thereto, a measuring rod passing through the said sleeve and into the said casing and projected from the end of the said sleeve, a dial in the casing and means whereby the extent of projection of the rod beyond the sleeve may be indicated upon the dial, substantially as set forth.

6. In a measuring instrument, the combination of a cylindrical casing, a graduated sleeve secured thereto, a measuring rod passing through the said sleeve and into the casing and projecting beyond the end of the said sleeve, a dial in said casing, means whereby the extent of projection of said rod may be indicated on the dial, and means whereby the rod may be secured in any position, substantially as set forth.

7. In a measuring instrument, the combination of a casing, a graduated sleeve extending from the side thereof and provided with grooves at its points of sub-division, a straight edge slidable upon said sleeve and provided with means for securing it to the said sleeve at the said grooves, a measuring rod projecting beyond the end of the sleeve, extending therethrough and into the casing, a dial in said casing, and means whereby the amount of projection of the said rod may be indicated upon the dial, substantially as set forth.

8. In a measuring instrument, a casing, a graduated sleeve extending therefrom, a straight edge slidable upon said sleeve, means for securing the straight edge fixedly with relation to the sleeve, a measuring rod projecting beyond the end of the said sleeve and passing therethrough and into the casing, a spring for holding the said rod projected, a resilient adjustable stop for limiting the extent of such projection, a dial in said casing, means whereby the extent of the projection of the said rod may be indicated upon the dial, and means whereby the rod may be secured in any given position, substantially as set forth.

9. In a measuring instrument, a straight edge having a passage-way therethrough, a graduated sleeve slidable in the said passageway, means for positioning and securing the said sleeve fixedly in any of a number of predetermined positions with respect to the said straight edge, a measuring rod in the said sleeve and projecting beyond the end thereof, and means actuated by said rod and movable relatively thereto for indicating directly the extent of such projection, substantially as set forth.

10. In a measuring instrument, a straight edge, a graduated sleeve slidable therein, a measuring rod within the sleeve coaxial therewith and spring pressed to extend normally beyond one end thereof, and means located at the other end of said sleeve and actuated by said rod for indicating directly the extent of such projection, said sleeve bearing indicia for indicating its position, substantially as described.

11. In a measuring instrument, a straight edge, a graduated sleeve slidable therein, a measuring rod slidable within the sleeve and spring-pressed to project one end normally beyond one end of said sleeve to a predetermined extent, and means located at the other end of said sleeve and actuated by said rod for indicating directly the extent of projection of said rod, said sleeve bearing indicia for indicating its position, substantially as set forth.

This specification signed and witnessed this 22nd day of July 1907.

WILLIAM C. MacKINNON.

Witnesses:
H. H. DYKE,
CHARLES F. ROBSON.